(12) United States Patent
Nemeth

(10) Patent No.: US 6,310,948 B1
(45) Date of Patent: Oct. 30, 2001

(54) METHOD AND APPARATUS FOR ANALYZING INTERNATIONAL LONG DISTANCE DIALING ERRORS AND AUTOMATICALLY COMPLETING A CALL

(75) Inventor: Ronald Nemeth, Bridgewater, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/971,433

(22) Filed: Nov. 17, 1997

(51) Int. Cl.[7] .................................................... H04M 3/42
(52) U.S. Cl. .............................. 379/213.01; 379/67.01; 379/220.01
(58) Field of Search .................................. 379/67.1, 209, 379/213, 216, 219, 220, 88.23, 265, 355, 214

(56) References Cited

U.S. PATENT DOCUMENTS

| | | | |
|---|---|---|---|
| 5,119,416 | * 6/1992 | Ortel | 379/213 |
| 5,333,180 | * 7/1994 | Brown et al. | 379/67.1 |
| 5,732,132 | * 3/1998 | Hamada | 379/354 |
| 5,884,193 | * 3/1999 | Kaplan | 379/88.23 |
| 5,892,820 | * 4/1999 | Amstrong et al. | 379/213 |
| 5,892,822 | * 4/1999 | Gottlieb et al. | 379/220 |
| 5,903,638 | * 5/1999 | Welter, Jr. et al. | 379/220 |
| 6,038,307 | * 3/2000 | Fahrer et al. | 379/209 |

* cited by examiner

Primary Examiner—Ahmad Matar
Assistant Examiner—Bing Bui

(57) ABSTRACT

A method for analyzing international long distance dialing errors and automatically completing a call it the error can be determined comprises the steps of receiving a dialed country code, city code and directory number. A potential error is determined by comparing one or pairs of the dialed country code and city code or the city code and dialed directory number or the combination of all three elements with predetermined valid dialing sequences for the dialed digits. For example, an error can be located between the country code and city code when a foreign telephone network has added a digit, for example, to expand the number of directory numbers available within a geographic area. A list of obsolete country codes, city codes or combinations thereof is stored in memory along with updated country codes and city codes. In one embodiment, a corrected dialed number is automatically redialed without further action by the caller. In another embodiment, the existence of a potential error in a dialed number is announced to the caller. The caller can further be prompted to agree with a reasonable correction of the dialed number and permit the automatic redialing of the telephone number intended. Apparatus for performing the analysis may comprise a known long distance network adjunct processor including a voice interactive system and access to a database of obsolete and valid international calling formats. In an alternative embodiment, even the dialed directory number may be corrected via access to a remote directory number database or international operator assistance may be provided.

22 Claims, 2 Drawing Sheets

METHOD AND APPARATUS FOR ANALYZING INTERNATIONAL LONG DISTANCE DIALING ERRORS AND AUTOMATICALLY COMPLETING A CALL

BACKGROUND OF THE INVENTION

1. Technical Field

The present invention relates to the field of international telecommunications call processing and, in particular, to method and apparatus for analyzing international long distance dialing errors and automatically completing a call if the error can be determined.

2. Description of the Related Art

Referring to FIG. 1A, there is shown a North American dialing plan for automatically accessing an international long distance telephone number without the assistance of an international operator. Most nations now have adopted certain international standards whereby one may access the foreign telecommunications network of a nation a caller calls without the caller's having to contact an international operator. In the United States, to obtain automatic international long distance access, one dials the digits 011 which comprise an international dialing access code IA. Other countries may adopt different codes, but the principle is still the same, the international dialing access code IA comprises a known code that distinguishes from intra-national (within the country) dialing codes such as those for accessing local and long distance services and assistance within the country.

Following the international access code IA, is a country code CO, the country code indicating the country or nation that the caller wishes to reach. Country codes used by international callers from the United States comprise two or three digits. Examples of country codes CO are 33 for France, 49 for Germany, 81 for Japan, and 972 for Israel. Again, this two or three digit country code is an agreed upon international country code that is used by callers all over the world to access a particular country adopting the standard.

If a country code comprises three digits, then, the maximum number of countries that can be dialed is one thousand. Since there are more than one thousand countries in the world, there is a requirement coming to increase the number of digits comprising the country code CO to four or more digits.

Following the country code, the caller frequently must enter a city code CI which may comprise one or two digits. Some countries do not require any city code, for example, Kuwait, which has a country code of 965 and does not require any city code. Thus, a minimum number of digits that can comprise a country code/city code combination is three digits. Examples may be Buenos Aires which has city code of 1 in Argentina. Argentina has a country code 54. So the combination for Buenos Aires, Argentina has three digits: 541.

In the United States and Canada and under the North American numbering plan, we call the city code CI an area code. Because of the great increase in demand for area codes in North America, it is contemplated that the "city code" or area code may, like the country code, exceed three digits and comprise four digits or more. Requirements in the United States that the area code have a middle digit of only a 0 or 1 have disappeared. Now an example area code may have the same three digits as the first three digits of a directory number.

The final step to dialing an international telephone number in the United States is to enter the local telephone number or directory number DN within the city and country desired. According to FIG. 1A, the local directory number DN typically comprises from 5 to 8 digits. On the other hand, as few as eight digits total including country code, city code and directory number (and excluding any international access code) may be required in some countries to complete a call to a directory number in that country.

In the United States and in foreign countries as well, there has been a considerable, almost an exponential growth, in the demand for new telephone numbers. Citizens no longer have just a telephone number for their residence telephone, they also may demand, for example, a telephone number for their portable cellular telephone, their pager, their personal computer and their facsimile machine. Foreign telecommunications carriers have to keep up with the demand by adding new city codes in a comparable mode to the way, in the United States, we have had to assign new area codes, for example, the new 732 area code in New Jersey. Also, the number of countries desiring to modernize their international dialing is fast approaching the one thousand level. It is difficult for telephone directories in the United States which provide international dialing instructions, let alone the international long distance service providers, to keep up with dialing plan changes necessitated by the demand for new telephone numbers. More and more, it is likely that a customer may refer to inaccurate sources for dialing information and, consequently, dial a number that may not be intelligible to the telephone network.

For example, France typically has a country code CO of 33 and the vicinity of Nice in France required a city code CI of 9. However, in order to increase the availability of telephone numbers in the vicinity, the French telecommunications network recently instituted the inclusion of a digit between the country code CO and the city code CI of 4. This digit must be included at location 2 in FIG. 1A. To further confuse matters, when one receives correspondence from one having a directory number DN in the vicinity, they are given the new directory number as, for example, 04 93 24 08 91. They may dial 33 04 93 24 08 91 by mistake, thinking that 04 is an accurate city code or they may dial 33 4 93 24 08 91; in other words, is the 0 in 04 necessary? The calling party may be confused by the instructions in their local telephone directory suggesting the entry of a country code and a one digit city code (the local directory may only identify the city code for Paris which is 1 and no other city codes). The caller may not know where the country code ends, the city code begins and ends and the directory number begins.

Referring again to FIG. 1A, at any one of locations 1, 2, 3 and 4, that is between the access code and country code, the country code and city code, between the city code and the directory number and in the directory number itself, there is an opportunity for a foreign telecommunications network to add new directory number capacity in a geographic region of the country by adding digits without deviating from the agreed-to international dialing plan.

Presently, when a caller in the United States tries to dial an international telephone number where the dialing plan has changed, the caller may receive no indication that there is a problem other than a prolonged "high and dry" period that may extend to a minute or longer where the caller, expecting to be connected, hears nothing. The high and dry condition can utilize national and international telecommunications resources for which no revenue will be obtained (and yet could have been used for other calls). Receiving such an indication, the caller may try again, then, receiving the same "high and dry" indication, try to reach their international operator, who may or may not be able to assist with the problem, depending on how well updated any database is that the international operator may have access to. Consequently, the international long distance carrier may suffer the tying up of an international operator for a period of time and obtain no revenue from the one or more call attempts. Moreover, each call attempt may tie up further local, international and foreign telecommunications facilities. Furthermore, the caller may be frustrated as they are not only unable to complete the call they want to but have no idea what the problem is. Of course, if the caller does take the additional step of calling an international operator for assistance and if the international operator is able to assist the caller, the international carrier providing the international operator services may be able to complete the call, but the international toll carrier may not be able to charge for the additional operator services because the international call completion failure was not the fault of the caller.

According to copending U.S. application Serial No., filed Aug. 27, 1997, there exists an opportunity under international dialing plans and standards to receive call value data providing some indication of why a call did not complete as dialed in the foreign country. For example, if the caller dials an invalid number, a cause code value of 28 is returned by the foreign network for "invalid number format. " Nevertheless, with such cause code value data, there is no provision for further automatically transmitting data that could be useful in updating a local database as to new foreign numbering plan changes. The present system only identifies a problem. Typically, changes to foreign dialing plans (adding digits at 1, 2, 3, or 4 in FIG. 1B) are handled "off-line" (not in real time). The foreign telecommunications carrier typically notifies the international carriers in the United States of changes in directory numbers and call routing so the changes can be made to their databases and call processing algorithms.

Consequently, there remains presently a problem with international calling plans and international dialing services that remains to be solved, the problem being that of assisting callers to reach the international telephone numbers they are trying to reach automatically and as efficiently as possible.

SUMMARY OF THE INVENTION

The problems and related problems of the prior art are solved by the principle of the present invention, a method and apparatus for analyzing international dialing errors and, if the error can be determined, automatically completing the call. A database of a consumer long distance adjunct processor known in the art is updated with new international dialing plan data and preserves associated obsolete country code and city code data. An adjunct processor comprises a controller/processor capable of processing calls, a database for storing data and an interactive voice or announcement system for communicating with a caller. Preferably, if a dialing error is detected and the error can be corrected, an announcement system of the adjunct processor may not only announce that a caller's call cannot be completed as dialed but describe the error and, moreover, suggest that the caller make note of the new dialing plan change. Once, the consumer is advised of the error and how the error may be corrected, the caller may make a reasonable determination of whether they agree with the automatic assessment provided via the adjunct. The caller may not have intended an international call at all, let alone, reach a party in a foreign country and city at the directory number the adjunct may announce to them. On the other hand, the caller may find the analysis of the error accurate, make note of the dialing plan change and, moreover, signal the adjunct that the adjunct may proceed with completion of the call. The interactive voice system and human factors interface the present invention presents to the international caller are important. One should not address the identification and correction of a misdialed call in the present invention without addressing the caller's behavior. The burden of processing dialing errors is weighed against the benefit of providing personal customer service to toll customers in determining different embodiments of the present invention.

In another preferred embodiment, no announcements are made at all. The first several digits, for example, up to eight digits after an access code are regarded, the digits are compared with anticipated country code and city combinations such as obsolete country or city codes, and, it the error can be positively determined, the call can be automatically relaunched with the corrected country code/city code. The caller in this embodiment may not know that a correction was made to the digits that the caller dialed. On the other hand, the call is efficiently and quickly processed without delay.

In yet another embodiment, where the country code and city code combinations may not be positively determined from the dialed digits regarded, the call may be automatically connected to an international operator for assistance. Yet in another embodiment, the international dialing habits of the caller may be stored over time and the collected information utilized for correcting dialing errors the caller makes in frequently called international numbers.

These and other embodiments and other features of the present invention will become apparent to one of ordinary skill in the art by reading the following detailed description of the invention in connection with the drawings.

DETAILED DESCRIPTION

Figure 1A:
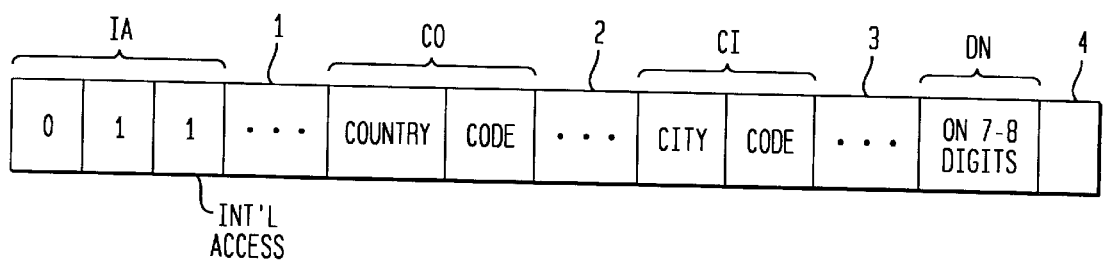
FIG. 1A provides an overview of an automatic international dialing plan described, for example, in telephone directories of local exchange carriers, where an international access code IA precedes a country code CO, the country code CO precedes a city code CI and the city code CI precedes a directory number for a called international party.
Figure 1B:
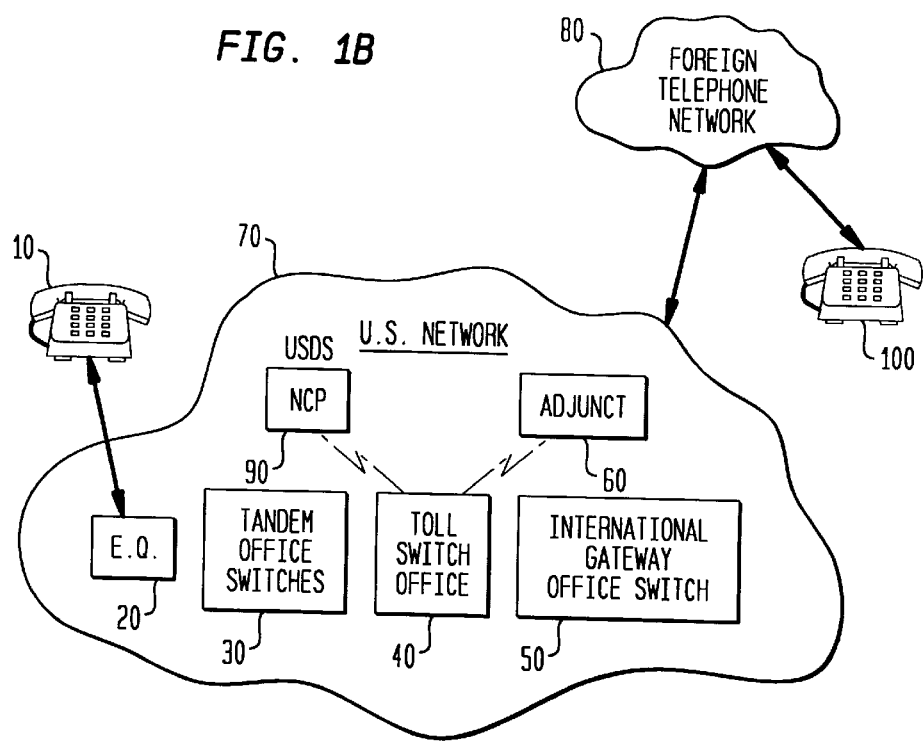
FIG. 1B describes the placement of an international call in the United States via a consumer long distance adjunct processor 60 for special services to consumers 10 trying to place international calls to a called party 100 connected to a foreign telephone network 80.

FIG. 1A has already been described in some detail for presenting the problem solved by the present invention. Referring to FIG. 1B, there is shown a system according to the present invention for completing an international call. A caller 10, unaware of a dialing plan change in a foreign telephone network 80, may dial 011, an international access code IA, a country code CO, a city code CI and a directory number DN and yet may not be able to complete their call through no fault of their own, the foreign telecommunication network 80 may have changed their numbering plan to include a change a any of locations 1, 2, 3 or 4. The change may comprise a single new digit or even two new digits, depending on the circumstances of the change. The change may be instituted at more than one location in the international telephone number simultaneously, for example, at each of location 1 and 2.

Referring to FIG. 1B, a typical world-wide telephone network comprises a domestic switched telephone network 70 and a foreign telephone network 80. Of course, the figure as drawn does not reflect that the domestic telephone network may connect to multiple foreign telephone networks 80, each of which may have their own dialing plan. In the United States, the caller at station 10 dials international access code IA 0-1-1 in order to signal an end office 20 in his local exchange area that the caller wishes to place an international call. The immediately following series of digits must represent a country code CO followed by a city code CI. As used herein city code should be construed to include the concept of area code or any other code following the country code and preceding a directory number. The digits for international access, country code and city code are followed by the directory number DN or telephone number of the called party that the caller wishes to speak to.

Traditionally, once the end office 20 receives the digits 0-1-1, the end office 20 knows that it is to forward the following digits to a toll switch 40 (sometimes via a tandem switch 30) which in turn forwards the dialed digits to an international gateway switching office 50 of the long distance carrier selected by the caller 10. Adjunct logical address (ALA) tables have been previously utilized by toll offices for locating adjuncts and forwarding calls to adjuncts for processing. In more recent toll network architectures, the toll switch has associated with it a USDS network control point 90 for service routing and priority that may eventually replace traditional ALA and toll office trigger tables (for example, which assist the toll office in obtaining a direct link to the international gateway). Also shown is a consumer long distance adjunct processor 60. The international gateway switching office 50 can connect to a selected foreign telephone network 80 represented by the following county code digits CO. The end office 20, for example, may signal the international gateway toll center 50 and intermediated office via either an inband or a more modern out-of-band signaling system. The end office 20 may forward the dialed digits and automatic number identification (ANI) data identifying the calling party 10 by their telephone number.

When the international gateway switching office 50, for example a #4ESS switch available from Lucent Technologies, Inc., receives the country code, city/region code and telephone number, office 50 is in a position to look both ways to establish links to the caller 10 via other network elements, if not already established, and the called party 100. In prior art in-band signaling, the communication links through tandem switching offices 30 and toll switching offices 40 are determined at the time of signaling international gateway switch 50. That is, the end office 20 attempts to reach gateway 50 by establishing successive communication links through, for example, tandem office 30, toll office 40 and finally to international gateway switch 50. In more modern out-of-band signaling systems, such as SS-7, the communication links are determined after signaling. For example, trigger tables and, eventually, a USDS network control point will assist in achieving as direct a link as possible between offices. In either event, the talking path between caller 10 and the gateway 50 are typically determined at the time or before the gateway office 50 begins to reach the foreign network 80. The international gateway switching center 50 then signals the foreign telephone network 80 by forwarding the dialed city/region code and telephone number of the called party.

If the caller 10 is identified as having subscribed to a special service available for example from their long distance carrier, their call may be processed by a consumer long distance adjunct processor 60, for example, associated with a toll switching office 40 (or another office in the domestic network 70). The present invention relates to what happens in the event the caller's initially dialed digits would result in an incomplete call, for example, because the caller 10 is left with a "high and dry" indication that nothing happened (there is no busy signal or ringing). The caller may suspect that there is something wrong with the number they dialed and may check a dialed number display if they have one or redial number. If they redial the number and receive the same response, they may try to reach an international operator to obtain assistance. If the international operator can help, the caller may be instructed about a readily recognized dialing problem; on the other hand, if the international operator cannot help, the call is lost and operator time is consumed.

Figure 2:
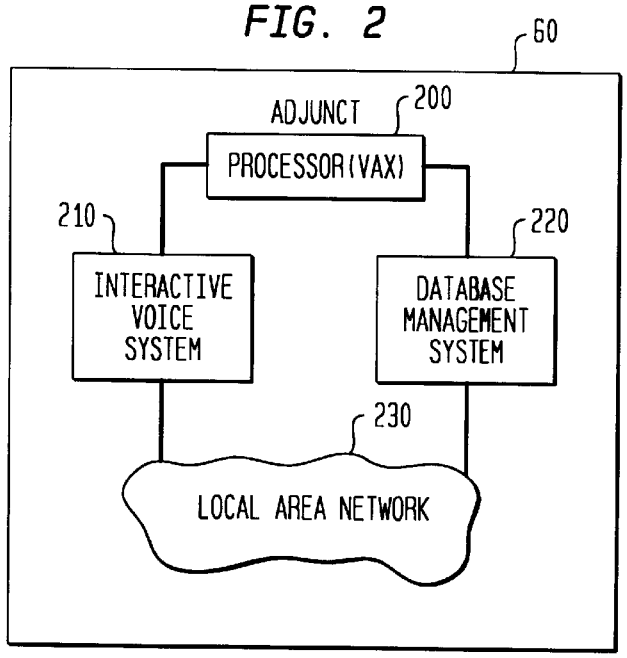
FIG. 2 provides a functional block schematic diagram of a consumer long distance adjunct processor 60 of FIG. 1B comprising a processor/controller, a voice system and a database.

Referring briefly to FIG. 2, a consumer long distance dialing adjunct processor 60 comprises an interactive voice system and a database management system under the control of a controller/processor that may be interconnected with others by a local area network 230. Such processors 60 are known, for example, for providing known international dialing services as automatic international redialing services available from AT&T. An interactive voice system 210, for example, is known such as a conversant system available from Lucent Technologies Inc. or one from Nortel. The interactive voice system 210 provides voice announcements and can receive and interpret speech responses or multifrequency tone signaling responses to queries almost as a virtual human dialog with an international operator. Controller/processor 200 may, for example, comprise a VAX machine available from Digital Equipment Corporation and have an associated database 220. Important to the present invention are the combination of the human factors interface of the interactive voice system 210 for user friendly assistance of callers trying to place international toll calls and the added call handling capability of the VAX processor 200, above and beyond normal call handling, to relaunch international calls found contain dialing errors. The present invention may be implemented in such an adjunct 60 or in connection with call processing algorithms implemented at a toll office 40 or gateway 50, provided each has database access and an interactive voice system.

Now that the problem solved by the present invention has been introduced, the present invention will be discussed with reference to FIG. 3. Database management system 220 may be a shared system of a domestic long distance carrier. As such, the database management system is updated with numbering plan changes of foreign telephone networks 80 and the ANI identification of callers who frequently call countries where the changes are occurring. For example, database 220 comprises a list of obsolete country codes and corresponding updated city codes. Referring briefly to FIG. 1, the updated country code may have an added digit at location 1 or 2 and the updated city code may have an added digit at location 2 or 3. Then, the algorithm and related algorithms of FIG. 3 of, for example, adjunct 60 will perform the action needed to intercept, analyze, inform and relaunch calls. Updates are shared among all toll offices 40 or international gateway offices 50 or any other switch of the domestic long distance carrier having access to database 220, for example, via the adjunct 60.

Figure 3:
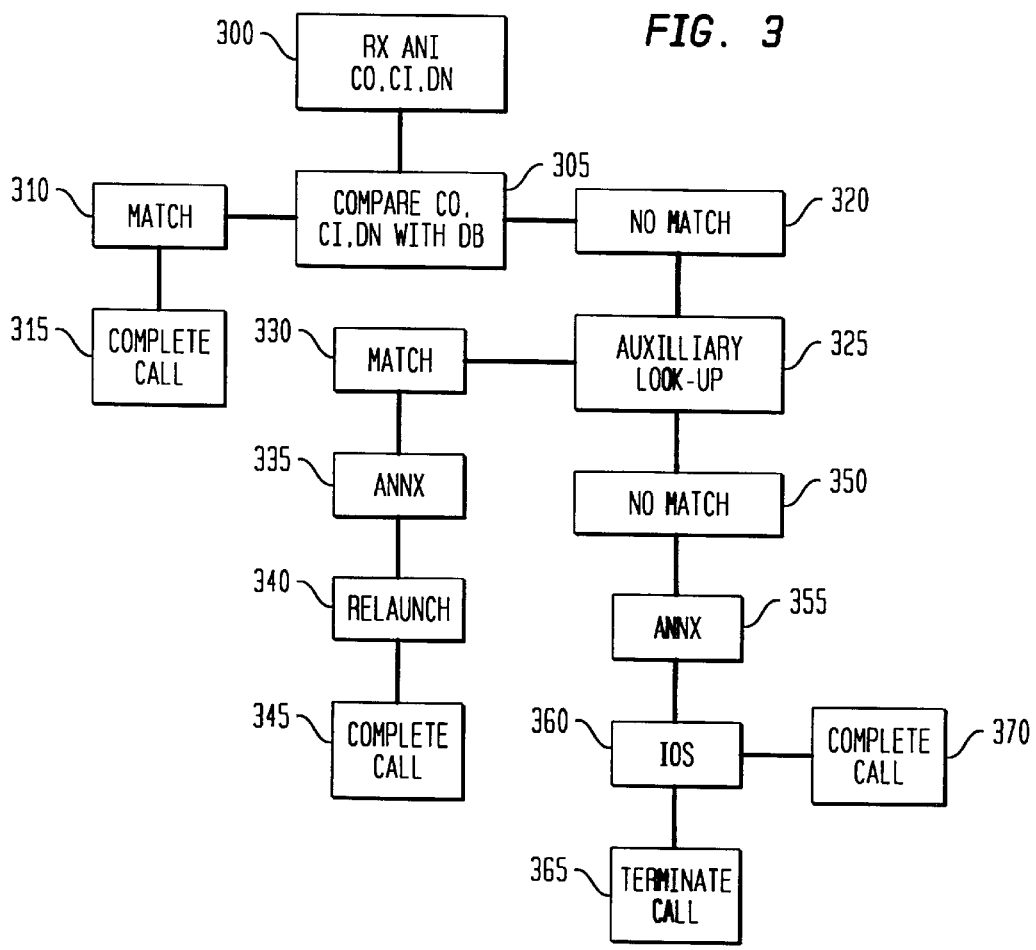
FIG. 3 provides a call processing flow chart for processing a call according to the present invention via adjunct 60 and with reference to FIG. 1B.

Adjunct processor 60 further comprises a controller or processor for performing an algorithm according to the present invention as suggested by FIG. 3. FIG. 3 provides one implementation of the present invention, other implementations may come to mind from the following description of a preferred embodiment. Adjunct 60 may house the present invention but in alternative or future embodiments, the present invention may be implemented practically anywhere within domestic network 70 or foreign network 80.

Before FIG. 3 is entered, a subscriber who has selected a long distance carrier capable of offering the service of the present invention dials an international call, for example, from their residence or business. The toll switch office 40 recognized the caller's telephone number via automatic number identification forwarded via the local exchange carrier. The toll office recognizes that the calling party is a subscriber to international long distance services and forwards the call to adjunct 60 for processing. There may be other ways in which the adjunct 60 may be called into the international call processing activity that may come to mind of one of ordinary skill in the art. Future plans for international dialing may involve network control point 90 and alternative means for directing call processing.

The processor/controller comprising the adjunct 60 refers to its database and determines what call processing is needed by looking at the ANI of the calling party 10 and the number dialed comprising all the elements forwarded by the toll switch 40 suggested by FIG. 1A after the international access code 0-1-1. In one preferred embodiment, as few as five and as many as eight or even more digits following the access code are regarded. At step 300, the ANI, the country code CO, the city code CI, and the directory number DN are all received at adjunct 60 and separately and together, for example, singly, in pairs, groups of three or in these or other combinations immediately compared with known values in database 220 at step 305. If regarded individually, problems may be determined or detected, but there may be insufficient information to correct an error. In accordance with the present invention, a match may first attempted for the first three to six or more digits such as eight digits of dialed number to locate a valid country code, a valid city code or valid country code/city code pair. A context-based algorithm is thus suggested by the present invention where, for example, the combination of country code CO and city code CI may be analyzed in the context of requiring both entries. In the two entries for country code and city code, an intermediate step not shown may be the elimination/compression of unnecessary zero (0) entries. Also, subsequently, after the directory number DN is determined, the either one or the other or the pair of city code and directory number may be analyzed. Moreover, the directory number DN may be regarded as well either separately or in context of both of the others. International directory number verification may require the connection of the adjunct 60 to yet another shared resource database (not shown) where all directory numbers for a dialed country's telephone network are located. Such a service may be provided by the foreign telephone network or a private entity and connected via a local or wide area data network or through the Internet.

Simplifying the analysis, the possible outcomes of match 310 or no match 320 represent an initial stage of analysis whereby the dialed number following the international access code is directly compared against a valid dialed number. If there is a match at step 310, then, the call is allowed to complete or may be completed automatically, and it may be assumed that the originally dialed number will or should result in a completed call. In this event, no announcement need be provided to the calling party 10 because the dialed digits appear to be accurately entered, the call can be completed as originally dialed, and the network assumes that an error occurred in call processing by domestic network 70 or foreign network 80.

On the other hand, if no match of the dialed digits occurs and results in a no match at step 320, the present invention assumes further that auxiliary look-up is available for obsolete country and city codes and/or context-based analysis can be performed. This present invention thus comprises step 325 where it may be learned from an analysis of the first three to six, and preferably up to eight, dialed digits that, for example, France now requires a 4 between their country code 33 and their city code for the Nice, France area 9. Thus, auxiliary look-up relates to the concept of not only regarding a county code and city code individually but together as a pair so that errors may be corrected. The first three digits 3-3-9 may be identified as a potential error by finding a match with an obsolete country code/city code combination, and the subscriber may learn to dial the corrected digits 3-3-4-9, especially since the error may be determined within a high probability of success. Thus, there may be a match to a reasonable correction at step 330 through the auxiliary processing at step 325 when a match could not be determined at step 305. This match can result in one embodiment with an automatic call relaunch with no message to the calling customer of where the error occurred.

In the analysis, a preferred analysis is to examine the first three to six digits for a country code city code match and in one-embodiment, up to eight or more digits, and then to proceed with an analysis of a proper city code, directory number combination. Other alternative steps of the analysis may come to mind of one of ordinary skill in the art.

Continuing with the example of dialing Nice, France. A voice announcement may then be provided to the caller 100 at step 335 via interactive voice system 210 in one preferred embodiment of the present invention. The announcement may provide one or more or combinations of the following forms of information as appropriate: 1) a feedback of the digits the consumer dialed and an explanation, 2) the existence of a potential error, 3) a potential reason why the call could not be completed as dialed, 4) instructions as to how the caller could have dialed the number to complete the call and 5) an offer to complete the call automatically. The service may request a voice or dial entry response to proceed.

For example, step 335 may operated as follows. The adjunct processor retrieves an assumed speech pattern for an announcement and inserts information according to the results of receiving a dialed number at step 300 and the results of call processing steps 305 and 325 where a potential error has been detected and a reasonable solution determined. The announcement might proceed as follows: "We were unable to complete your call as dialed. We understand that you dialed the directory number 3-2-4-0-8-9-1 located in city code 9 (the Nice region) of country code 33 (France). The French telephone network now requires you to insert a 4 between the country code and the city code. Please make a note of this change. If you wish us to complete your call for you, please say yes or, using your keypad, enter *."

If the customer enters an * or speaks "yes", then the call can be automatically redialed at relaunch step 340. The opportunity for the caller to speak "yes" or dial * can affirm the reasonable determination of an error by the adjunct 60. In other words, the adjunct does not have to be perfectly corrected in its determination of a potential error and a reasonable correction. The adjunct may have more than one match or solution to the problem and announce if the caller would like to hear the adjunct's second most likely solution to their dialing problem if the adjunct can determine such a second-best solution. This is a feature that may require more complex context-based analysis than a simple analysis of country code and city code taken together.

Of course, if the consumer says "yes" or enters a requested dialed digit or sequence of digits, the adjunct reattempts the call at relaunch step 340 and completed the call at step 345. The customer is happy, the long distance carrier saves operator services and obtains call revenue otherwise lost to it. The long distance carrier offering the present service need not charge for the service itself. The service of the present invention becomes a value-added feature not necessarily provided by another long distance carrier offering international long distance connection services.

In a simplified embodiment of the present invention, an international telephone number dialed with an error may be automatically relaunched if the error can be positively determined. For example, in the Nice, France dialing example given above, the error is clear. The French network change had just occurred. In this embodiment, processor 60 preferably intercepts calls dialed to known, recognized, but obsolete country code and/or city code combinations for which the solution is known. Consequently, such an error can be corrected with assurance and the call relaunched without hesitation. This immediate relaunch of the call for the caller may mean a faster call completion for the caller, but, a disadvantage of such an embodiment may be that the caller may receive no notice of how they can dial the international call in the future without error. A remedy for this problem might be to provide an announcement to the caller of the country code or city code change as soon as the called party hangs up and before the calling party hangs up or by ringing back the calling party with the announcement immediately after hang-up.

In yet another embodiment, calling patterns of an international caller may be memorized at adjunct 60. A caller that frequently called a called party may inadvertently dial a wrong number that can be corrected by comparison with a frequently called dialing list stored in memory of adjunct 60. In such an embodiment, a directory number correction may be relatively easy to perform.

A context-based analysis of all the components of the dialed number of FIG. 1A, if performed, may result in the correction of errors at any one of locations 1, 2, 3 and 4. For example, there may be a recently instituted increase in the number of digits of a local number from seven digits to eight or the dialed directory number may have changed to a newly assigned directory number because the dialed customer may have moved. Such an analysis may require the connection to an auxiliary database for directory numbers either administered by the foreign telephone network or by a private entity for the foreign telephone network. In such an instance, the message might follow at step 335: "We were unable to complete your call as dialed. We understand that you dialed the number 3-2-4-0-8-9-1 located in city code 9 (the Nice region) of country code 33 (France). The directory listing you just dialed is for the Hotel of Vence and their number has recently changed to 3-3-2-5-2-9-4. Please make a note of this change. If you wish us to complete your call for you, please say yes or, using your keypad, enter *. " The subscriber may recognize that the directory number listing is the number they wished to dial and proceed with the call. However, as earlier suggested, to determine a complex change, such as an increase in the number of dialed digits or combination errors occurring at two locations in FIG. 1A, the adjunct 60 may have to refer to an auxiliary database and, moreover, determine, from the context of the entire number dialed per FIG. 1A, how and where the error occurred and make assumptions on what caused the error.

In a preferred embodiment that anticipates the future where up to four digits may comprise a country code and a similar number a city code, there still may exist two digit country codes and single digit city codes and the like which may be followed by five digit directory numbers. Consequently, if an embodiment of the present invention regards eight digits after the access code, this regarding of eight digits may permit not only country code and city code but directory number analysis. On the other hand, and for other countries, up to eight digit analysis may only permit country code/city code analysis.

Any number of changes to a local numbering plan or directory number may require complex context-based analysis at several levels. By plural levels is meant, not just individual analysis of entries such as country code and city code, but pairs of entries or the entire dialed number following the international access code. Once the adjunct solves a particular problem, the adjunct 60 may learn from the consumer feedback and assume a solution to similar problems. Such processes are not shown in the present flow diagram but may be provided. Referring again to FIG. 1A, the problem caused by the dialer may be related to changes in the dialing plan of a foreign network, changes that may appear at 1, 2, 3 or 4. Another possible change described above, is that the directory number DN has in fact changed due to a dialing plan change or due to a changed listing necessitated, for example, by a relocation of a called party. Each of these may be solved in accordance with the present invention. Even combinations of changes or errors are possible solved where the error may occur at any of locations 1, 2, 3 or 4. A reasonable correction may be identified and announced to the caller at step 335 and, if the caller agrees with the proposed solution, the call can be reattempted at steps 340 and 345. Finally, if the user verifies the change, the system may learn from the experience and provide such a solution to the same caller or a new caller with the same dialing problem.

If the context-based analysis of the present invention fails, there is still an opportunity to provide alternative solutions to the caller 10. If there is no match at step 350, the announcement step 355 may result in the announcement: "Your call may not be completed as dialed. We interpret your request as one requesting a telephone number in Nice, France. If you wish, we can connect you to an international operator. " The caller again is provided with an opportunity to agree or disagree with the analysis and/or examine the number they dialed. If the caller responds "yes" or dials a predetermined code or code sequence, the caller may be connected to international operator services at step 360. The operator in turn may connect the caller to directory assistance in the foreign network or may be otherwise able to assist the caller in completing the call to their intended caller at step 370. If the caller cannot be helped, the call terminates at step 365.

Other features of the present invention may include the opportunity to offer auxiliary known services to the caller 10, such as automatic international redial if the called party is unavailable or their line is presently busy. The announcements and prompts at step 335 or 355 may be provided to the caller in a selected foreign language, such as Spanish for a Spanish-speaking American. Any patent applications or patents referenced herein should be deemed to be incorporated by reference as to their entire contents for any material deemed necessary to an appreciation of the present invention. The present invention should only be deemed to be limited by the scope of the claims that follow.

What I claim is:

1. A method for completing an international call when the call cannot be completed as initially dialed comprising the steps of receiving a dialed country code, city code and called party number, comparing combinations of said country code, city code and called party number to detect if there exists a potential error in the country code, between the country code and city code and between the city code and the called party number and announcing the detected potential error in the country code, between the country code and city code and/or between the city code and the called party number to the calling party.

2. A method as recited in claim 1 further comprising the steps of determining a reasonable correction of the detected potential error and announcing the reasonable correction to the calling party.

3. A method as recited in claim 2 wherein said announcement step further comprises a prompt for the calling party to accept the reasonable correction.

4. A method as recited in claim 3 further comprising the step of receiving a predetermined prompt from the calling party and completing the call to a dialed number incorporating said reasonable correction.

5. A method as recited in claim 2 further comprising the step of learning the validity of a reasonable correction if the calling party verifies the reasonable correction.

6. A method as recited in claim 1 further comprising the steps of referring to a database of obsolete country codes and city codes and corresponding updated country codes and city codes and retrieving an updated country code and city code for an obsolete country code and city code from a database that matches said received country code and city code.

7. A method as recited in claim 6 wherein said comparison step comprises the step of regarding the first three to eight digits of the dialed number.

8. A method as recited in claim 1 further comprising the step of announcing to the called party the opportunity to connect to international operator assistance.

9. A method as recited in claim 1 wherein said announcement step further comprises announcing the country code and city code dialed by the calling party.

10. A method as recited in claim 1 wherein said announcement step further comprises announcing a dialed number following an international access code.

11. A method as recited in claim 1 further comprising the steps of determining a reasonable correction of the detected potential error and completing the call to a dialed number incorporating said reasonable correction.

12. A method for completing an international call when the call cannot be completed as initially dialed comprising the step of receiving a number of digits between three and eight digits of the dialed number, storing the dialed number, comparing the three to eight digits of the dialed number with a list of obsolete country code and city code combinations, retrieving an updated country code and city code combination if there is a match between the three to eight digits and the list of obsolete country codes and city codes and automatically redialing the dialed number including the updated country code and city code retrieved.

13. A method as recited in claim 12 further comprising the step of announcing to the calling party the updated country code and city code.

14. A method as recited in claim 12 further comprising the step of requesting the caller to signify acceptance before the automatic redialing step.

15. A method for completing an international call when the call cannot be completed as initially dialed comprising the steps of receiving a number of digits between one and four digits of the dialed number, storing the dialed number, comparing the one to four digits of the dialed number with a list of obsolete country codes, retrieving an updated country code if there is a match between the one to four digits and the list of obsolete country codes and automatically redialing the dialed number including the updated country code retrieved.

16. A method as recited in claim 15 further comprising the step of announcing to the calling party the updated country code.

17. A method as recited in claim 15 further comprising the step of requesting the caller to signify acceptance before the automatic redialing step.

18. A method for completing an international call when the call cannot be completed as initially dialed comprising the steps of receiving a number of digits between three and eight digits of the dialed number, storing the dialed number, comparing the three to eight digits of the dialed number with a list of obsolete city codes, retrieving an updated city code if there is a match between the three to eight digits and the list of obsolete city codes and automatically redialing the dialed number including the updated city code retrieved.

19. A method as recited in claim 18 further comprising the step of announcing to the calling party the updated city code.

20. A method as recited in claim 18 further comprising the step of requesting the caller to signify acceptance before the automatic redialing step.

21. A method of completing an international call to a called party's number when the call cannot be completed as initially dialed, comprising the steps of:

receiving an international call that includes a first digit string indicative of the geographic destination of a called party and a second digit string comprising the called party's address within that geographic destination;

comparing the received first digit string with obsolete first digit strings to determine the existence of an error and retrieving an associated, updated first digit string different from the received first digit string and completing the international call including the retrieved first digit string and the second digit string.

22. A method of completing an international call as recited in claim 21 further comprising the step of announcing the retrieved first digit string.

\* \* \* \* \*